June 13, 1967  M. R. BURNS ETAL  3,325,807
GROUND CLEARANCE WARNING SYSTEM
Filed Dec. 20, 1957  5 Sheets-Sheet 1

INVENTORS.
MAURICE R. BURNS
BY  WILLIAM F. McQUILLAN

*Allan Rothenberg*

ATTORNEY

United States Patent Office 3,325,807
Patented June 13, 1967

3,325,807
GROUND CLEARANCE WARNING SYSTEM
Maurice R. Burns, Santa Ana, and William F. McQuillan, Downey, Calif., assignors to North American Aviation, Inc.
Filed Dec. 20, 1957, Ser. No. 704,206
15 Claims. (Cl. 343—16)

This application relates to flight aids for aircraft pilots and avoidance of obstacles.

An object of the invention is to warn the pilot whenever a ground obstacle projects above a clearance plane a predetermined distance below the flight path of the airplane.

A further object is to display the relative contour levels whenever the terrain features protrude above the clearance plane when the clearance plane is parallel to a plane tangent to the earth's surface immediately below the aircraft.

A further object is to provide a means of obtaining relative heights of obstacles through manipulation of clearance plane.

A further object is to provide improved indications of ground profile.

Other and further objects, features and advantages of the invention will become apparent as the description proceeds.

In carrying out the invention in accordance with a preferred form thereof, warning signals are obtained by utilizing the properties of a monopulse radar system and adjusting the strength of error signals to be equal to or less than adjusted sum signals under safe conditions with no obstacle prejection above the clearance plane. When an obstacle protrudes above the clearance plane, the adjusted error signals are greater than the adjusted sum signals and the difference produces a warning indication.

A better understanding of the invention will be afforded by the following detailed description considered in conjunction with the accompanying drawings in which FIG. 1 is a graph illustrating the principle of operation of a monopulse radar system in relation to level ground;

Like reference characters are utilized throughout the drawings to designate like parts.

Figure 2:
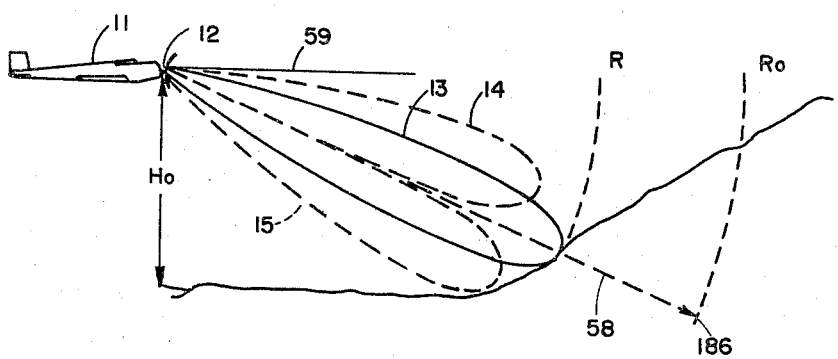
FIG. 2 is a diagram illustrating the manner of employing properties of monopulse radar for detecting irregularity in ground profile.

Referring to FIG. 2 of the drawing, an aircraft 11 is provided with a monopulse radar having an antenna 12 so arranged as to produce sum signals representative of energy reflected with intensity represented by a lobe pattern 13 and error signals representing difference between energy reflection with intensity represented by two lobe patterns 14 and 15.

The antenna 12 is of the conventional paraboloid type with feed elements 16 and 17 (FIG. 5) such as those employed, for example, in the monopulse system described in the copending application of Robert M. Ashby, Ser. No. 216,145, filed Mar. 17, 1951, with a pair of wave guide channels 18 and 19, coupling the feed elements 16 and 17, through a hybrid bridge 21, through wave guides 22 and 23, mixer-duplexer 24 and mixer 25 to a transmitter 26 and to sum and error channels 27 and 28, respectively, of monopulse receiver equipment of the type described in the foregoing application of Robert M. Ashby.

For conversion of the energy in the sum and error channels 27 and 28 to intermediate frequency signals, mixers 29 and 30 are employed which may include preamplifiers. Intermediate frequency amplifiers 31 and 32 are provided for the sum and error channels respectively and there are corresponding video sum detector 33 and video phase detector 34. Suitable means are provided for preventing receiver saturation and retaining gain tracking and dynamic range of the receivers. Although receivers with instantaneous automatic gain control which are special receivers, may be employed, we have found it unnecessary to use special receivers and that less expensive, sturdier, standard receivers may be employed by preventing saturation, for example, by suitable gain control. For controlling the gain of the intermediate frequency amplifiers 31 and 32 in the same manner so that the channels remain matched, bias level control terminals 35 and 36 are connected to a common line 37, the potential of which is adjusted to prevent saturation. For example, the potential may be adjusted with range in such a manner as to make the output of the channels 27 and 28 independent of range. To this end, a generator 38 is provided which has a voltage output inversely proportional to the square of the range. An adjustable fixed bias source 39 is provided and a difference circuit 40 is utilized having input connections from the inverse-range-squared generator 38 and the adjustable fixed bias 39, and having an output to the gain control connection 37.

Connections are provided for combining differentially the output of the error video phase detector 34 and the modified output of the sum detector 33 in a warning indicator 42. A multiplier 43, suitable for video frequencies, is interposed in the output line 44 of the sum video detector 33 for introducing a factor representing the angle between a reflected signal and the center line of the antenna 12 when the aircraft 11 is flying at a fixed height above level ground. This angle has been found to bear a functional relationship to slant range of the reflected signals and altitude of the aircraft above level terrain. A difference amplifier 45 is provided having input connections from the multiplier 43 and the error video phase detector 34 and having an output line 46 to the warning indicator 42.

In order to set in a factor $H_o/R$ representing the ratio of desired clearance altitude to the range of reflected signals, a generator 47 is provided for producing a voltage inversely proportional to the range of the reflected signals. An adjustable fixed voltage output source 48 is provided having a tap 49 enabling selection of a voltage of magnitude corresponding to the altitude of terrain clearance that is desired. A multiplier 51 is provided for obtaining the product of the output of the generator 47 and the altitude tap 49 to produce the factor $H_o/R$.

In order to set in a value representative of the depression angle between the center line 58 (FIG. 2) of the antenna 12 and the line of flight 59 of the aircraft, a second voltage source 52 (FIG. 5) is provided having an output, the magnitude of which is selected to correspond to the antenna depression angle. A difference amplifier 53 is provided for combining the outputs of the voltage source 52 and the multiplier 51. The difference amplifier 53 has an output line 54 serving as a second input line to the multiplier 43. As will be understood by those skilled in the art, in radar systems the transmitter 26 is made responsive to tripping impulses for successively transmitting trains of high frequency waves or pulses in response to successive tripping impulses. A line 55 on which such tripping impulses are produced in the transmitter 26 by a generator 50 is brought out for synchronization of the range multiplying functions.

Figure 6:
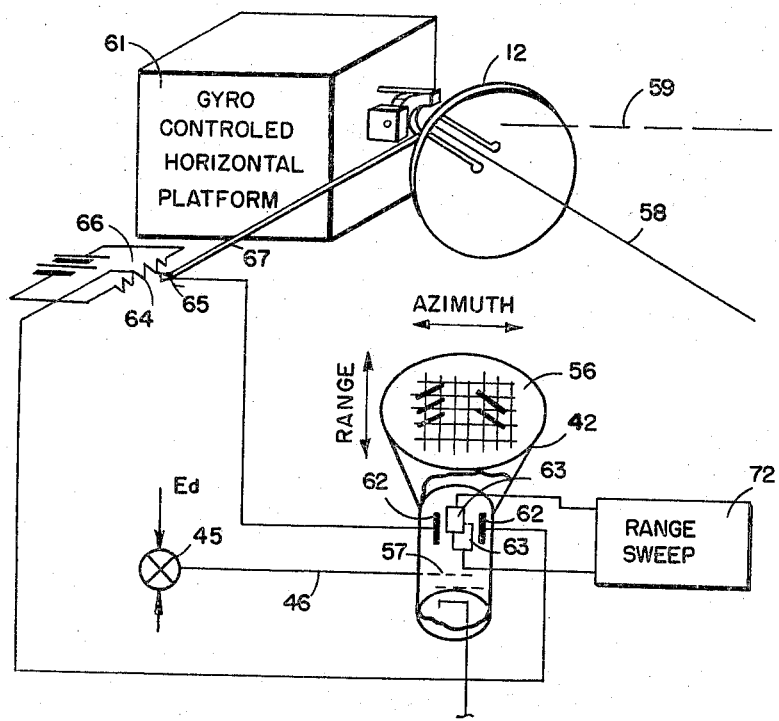
FIG. 6 is a circuit diagram partially schematic, of the apparatus of FIG. 5.

As shown in FIG. 6, the warning indicator 42 may take the form of a cathode ray tube for producing B type presentation of signals with range plotted vertically and azimuth plotted horizontally, as illustrated by a screen representation 56. The cathode ray tube 42 includes a beam intensification electrode 57 which is connected to the output line 46 of the difference amplifier 45 for causing a bright spot to appear on the screen of the cathode ray tube 42 whenever the input to the difference amplifier 45 from the error circuit video phase detector 34 exceeds that from the multiplier 43. Suitable means are provided for causing the antenna 12 to maintain a predetermined depression angle of its center line 58 in respect to either the horizontal represented by line 59 or the projected velocity vector which is also the horizontal vector (flight path) of the aircraft when the aircraft is in level flight. In order to simplify mechanization of the pertinent equations, suitable means such as a gyro-controlled stable platform 61, for example, is provided for maintaining the fixed depression angle of the antenna 12.

In order to obtain the range and azimuth sweeps of the beam of the cathode ray tube 42, conventional means are provided for applying appropriate sweep voltages to horizontal or azimuth deflection plates 62 and to vertical or range deflection plates 63. For supplying the azimuth voltage, mechanism responsive to the position in azimuth of antenna 12 is provided, which is represented schematically as taking the form of a potentiometer 64 across which a fixed voltage is produced having an adjustable tap 65 and a fixed center tap 66, the taps being connected to the plates 62. The adjustable tap 65 is mechanically connected by means represented schematically by an arm 67 connected by means (not shown) to the horizontal scanning mechanism of the antenna 12.

In order to produce voltages varying inversely with range, resistance-capacity charging circuits are employed in conjunction with electronic control devices for producing square-wave voltages.

Figure 7:
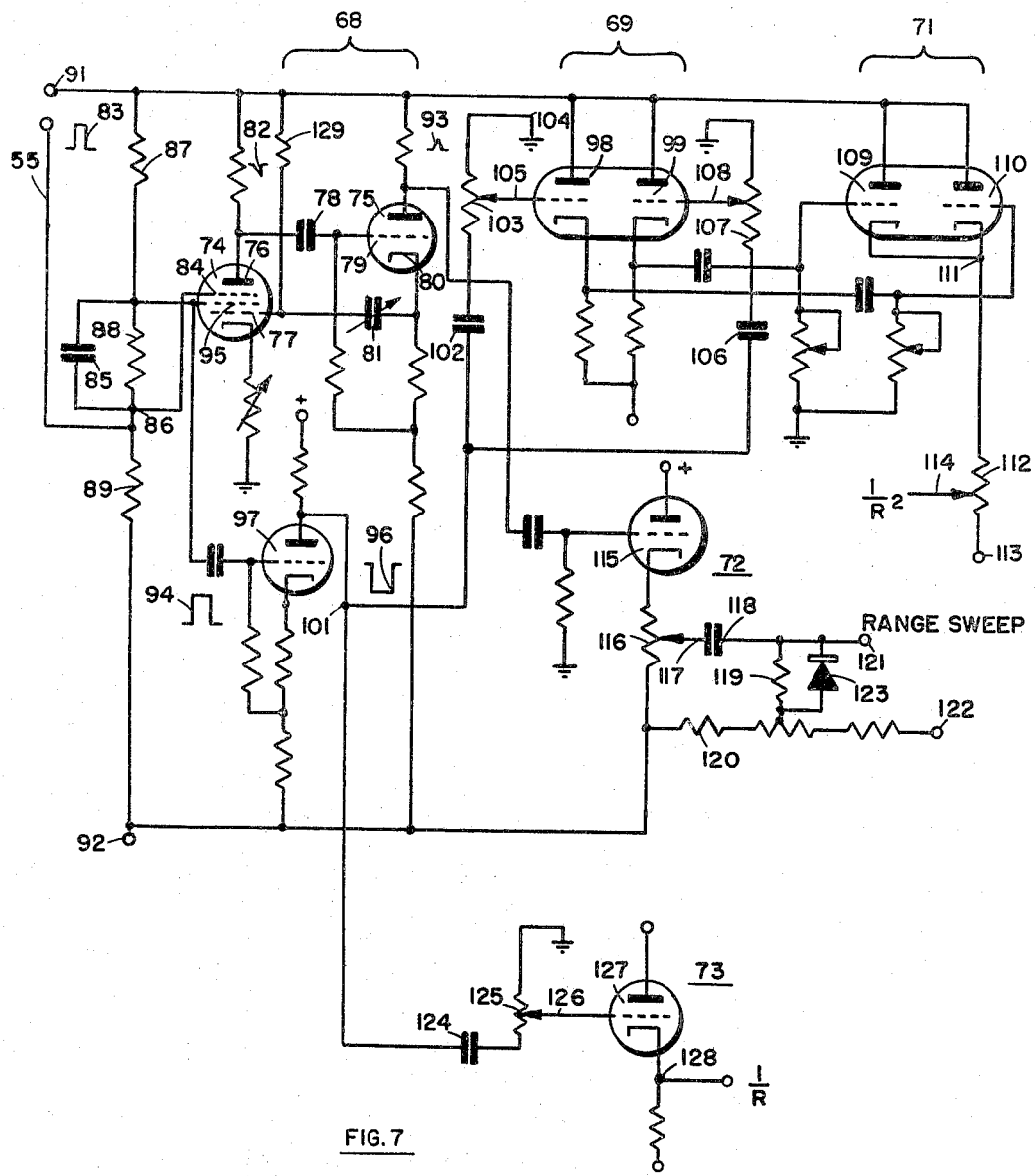
FIG. 7 is a circuit diagram of the apparatus for generating gain control voltages to compensate for variations in slant range.

For example, as illustrated in FIG. 7, a phantastron circuit 68 is provided for supplying a square wave. A double triode isolating unit 69 is provided for supplying the square wave from the phantastron 68 independently to two different resistance-capacity charging circuits having different time constants and output magnitudes in order that an approximate cubic or inverse function may be produced from the exponential waves of the resistance-capacity charging circuits. Finally, there is an addition circuit 71 for combining the exponential waves to form the simulated inverse function wave. An isolating circuit 72 is provided for supplying a range sweep voltage from the triangular wave output of the phantastron circuit 68. Preferably also an additional isolating circuit 73 is provided for producing an inverse function of a square wave of the phantastron 68.

The phantastron circuit 68 employed comprises a pentode tube 74, to which a triode 75 is coupled. To provide capacitive feedback from the anode 76 of the tube 74 to its No. 1 grid or control electrode 77, instead of connecting a negative-feedback coupling condenser 78 directly between the anode and control grid of the tube 74 as in conventional phantastron circuits, the triode 75 is interposed with the coupling condenser 78 connected between the anode 76 of the tube 74 and the control grid 79 of the triode 75, with the cathode 80 of the triode 75 coupled through an additional adjustable condenser 81 to the control grid 77 of the pentode 74.

For controlling the pentode 74 and starting a negative-going triangular pulse 82 at the anode 76, the line 55 at which a transmitter tripping impulse 83 appears is coupled directly to the suppressor grid 84 of the pentode 74. The suppressor grid 84 is normally biased to a negative or cutoff potential by direct connection to an intermediate terminal 86 of a voltage divider consisting of resistors 87, 88 and 89 in series between the power-supply positive terminal 91 and a negative terminal 92.

The triode 75 acts as an inverter so that a positive triangular wave 93 appears at its anode for use in the range sweep circuit 72. A positive square wave 94, however, appears upon the screen grid 95 of the pentode 74 which is connected to the positive terminal 91 of the power supply in series with the resistor 87.

For inverting the square wave 94 to form a negative square wave 96 for use in the circuit 69, a triode inverter 97 is coupled capacitively to the screen grid 95 of the pentode 74.

The unit 69 comprises a pair of triode elements 98 and 99 coupled through resistance-condenser circuits to the output terminal or anode terminal 101 of the triode inverter 97 receiving the square wave output of the phantastron circuit 68. The input to the triode element 98 comprises a charging circuit consisting of a condenser 102 and a resistor 103 connected in series between the square wave output terminal 101 of the phantastron unit 68 and a ground terminal 104 with a tap 105 of the resistor 103 serving to permit adjustment of the magnitude of the wave in exponential form taken from the charging circuits 102 and 103 and supplied to the triode 98, which is a cathode follower unit. In a similar manner, another charging circuit consisting of a condenser 106, a resistor 107, and an adjustable tap 108 is connected in series between the negative square wave output terminal 101 of the phantastron unit 68 and the ground terminal 104 with the adjustable tap 108 forming the input connection to the triode element 99.

The addition circuit 71 comprises a double triode tube with triode elements 109 and 110 also connected as cathode followers with control grids capacitively coupled to the cathodes of the triode elements 98 and 99 and with a common cathode 111 serving as an output terminal connected through a cathode resistor 112 to a negative power supply terminal 113. Preferably an adjustable control tap 114 is provided on the cathode resistor 112 in order that a simulated inverse wave proportional to the square of the range of adjustable magnitude may be taken from the tap 114.

The range sweep circuit 72 comprises a triode 115 capacitively coupled to the positive triangular output wave terminal or anode terminal of the tube 75 with a cathode resistor 116 having an adjustable tap 117 coupled through a condenser 118, resistors 119 and 120, to range sweep terminals 121 and 122, the resistor 119 being bypassed by a diode 123.

The voltage inversely proportional to range is obtained from the negative square wave 96 by means of a charging circuit consisting of a condenser 124 and a resistor 125 with an adjustable tap 126 interposed between the negative square-wave anode 101 of the phantastron circuit 68 and the input to the cathode follower tube 127, having a cathode 128 at which an inverse range function voltage appears.

In the operation of the phantastron circuit 68, the pentode 74 is initially nonconducting by reasons of a negative bias upon the suppressor grid 84. The potential at the anode 76 is at the potential of the positive power terminal 91. Current is flowing between the screen grid 95 and the cathode of the tube 74 and through the resistor 87. The positive triggering potential of the pulse 83 applied to the suppressor grid 84 causes current to flow between the anode and the cathode of the pentode 74 and the potential of the anode 76 immediately falls. This drop in anode potential is coupled through condensers 78 and 81 (the tube 75 being connected as a cathode follower) to the control grid 77 of the pentode 74 causing the grid potential to fall which in turn tends to cause the anode current to fall. At this point in operation in the circuit, the anode potential is only a few volts below that of the positive power supply current 91 and the grid potential is negative enough to prevent all but a small amount of current to flow between the anode and the cathode. An integrating action takes place between the output and the input of the pentode 74.

An electron current flows through resistor 129 and the condenser 81 since the cathode follower 75 acts to maintain its grid and cathode potentials at the same level. The potential at the anode 76 falls relative to the potential at the control grid 77. The potential at the anode 76 is falling linearly at the rate determined by the capacity of the condensers 78 and 81 and the resistance of the resistor 129.

The linear run-down at the anode continues until the anode potential reaches a level where, due to the characteristics of pentode 74 further drop in potential at the anode is impossible. Current now ceases to flow between the cathode and the anode but instead flows between the screen grid 95 and the cathode through the resistor 87 from the positive power supply terminal 91. The potential of screen grid falls and this fall is coupled to the suppressor grid 84 through the capacitor 85, further cutting off the flow of current from the anode and causing the anode potential to rise immediately to that of the positive power supply terminal 91.

The application of the positive trigger potential 83 to the suppressor grid 84 starts a cycle which produces triangular wave linear run-down of the anode potential.

Figure 8:
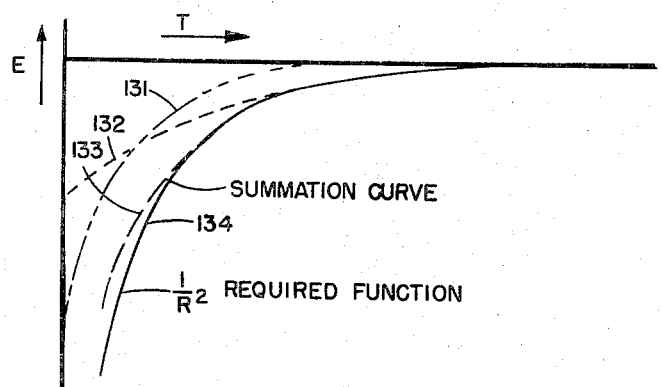
FIG. 8 is a graph explaining operation of the apparatus of FIG. 7.

As illustrated in FIG. 8, the voltage appearing on the tap 105 of the charging circuit of the isolating unit 69 is exponential in form such as represented by the curve 131. The magnitude of the voltage depends upon the setting of the tap 105 on the resistor 103. Likewise, the voltage upon the tap 108 of the resistor 107 is also exponential as represented by the curve 132. The magnitude of this voltage depends upon the setting of the tap 108. However, the difference in shape of the curves of 131 and 132 is a result of difference in time constant of the charging circuit 102–103 from the charging circuit 106–107. These voltage waves appear also upon the cathodes of triode elements 98 and 99; and by the addition circuit 71 they are combined at the cathode terminal 111 of the addition circuit 71 to produce the resultant wave 133, the voltage magnitude of which may be adjusted by the setting of the tap 114 on the cathode resistor 112 of the addition circuit 71. In FIG. 8, the voltage is plotted vertically and time, which is proportional to range, is plotted horizontally. The theoretically computed value of the quantity $$=\frac{1}{T^2}$$

is represented by the full line curve 134. It will be observed that by the selection of the parameters of the curves 131 and 132, the resultant 133 will be made to conform closely to the theoretical inverse range square curve 134 within the range of normal operation of the apparatus.

Figure 5:
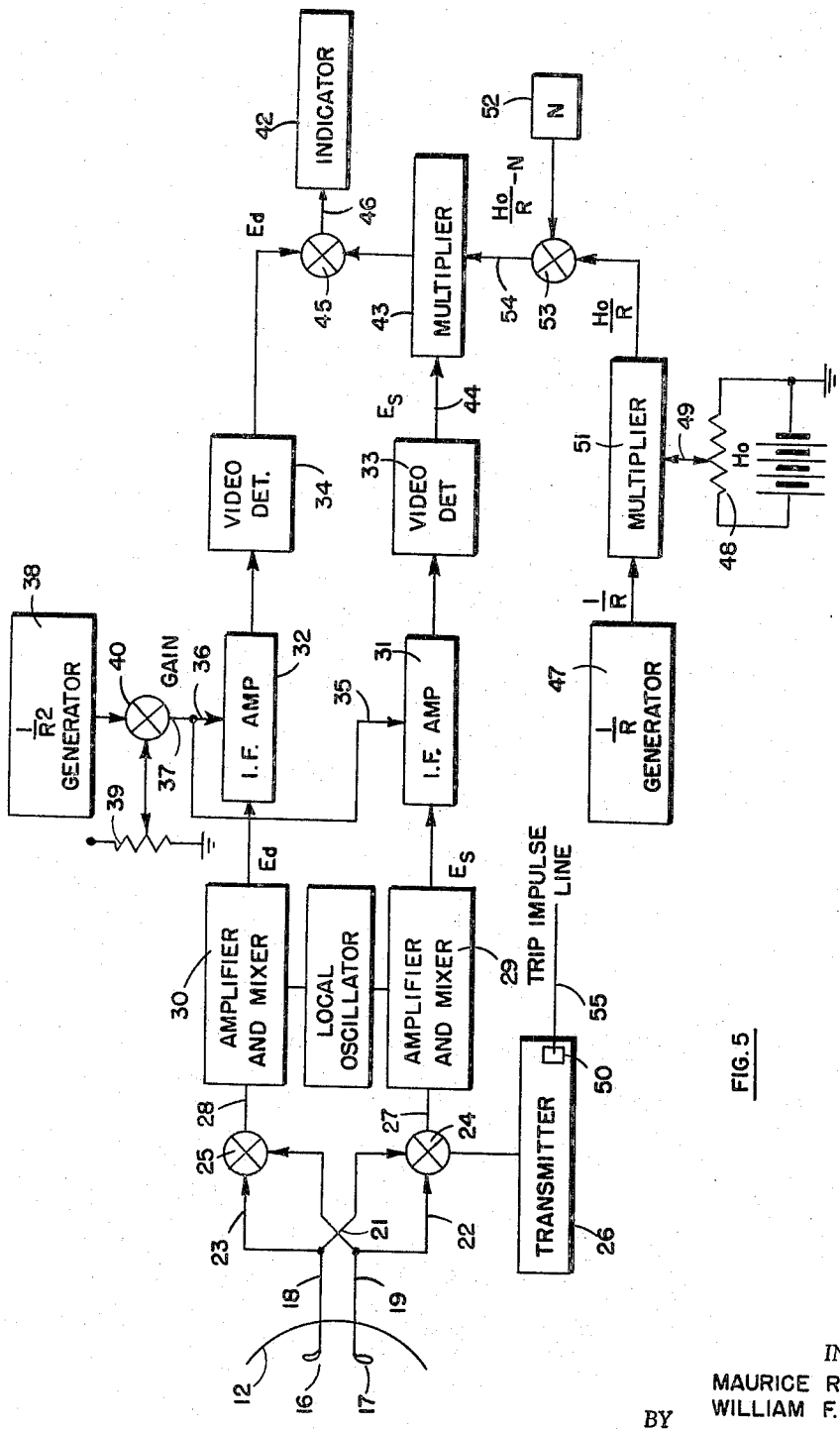
FIG. 5 is a schematic block diagram of electrical circuits of a ground clearance warning system embodying the invention of the application.

The form of the curve 131 represents a sufficiently close approximation of the equation $$E=\frac{1}{T}$$

that a single charging circuit may be employed in the inverse range circuit 73 for introducing the $H_o/R$ factor of FIG. 5.

Figure 9:
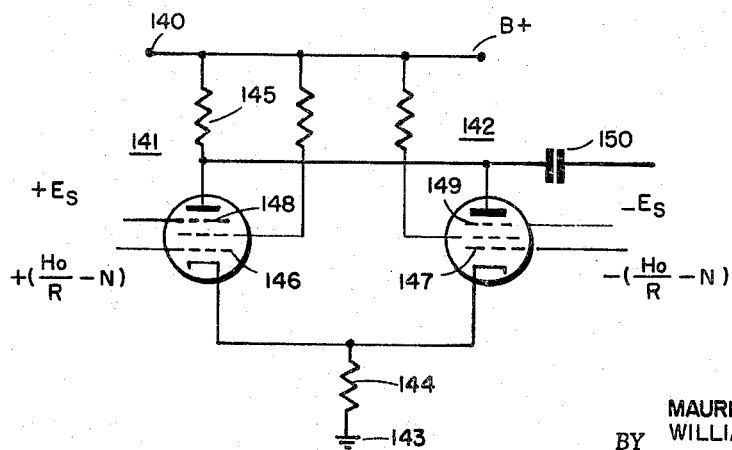
FIG. 9 is a circuit diagram of a multiplier utilized in the apparatus.

In our apparatus, multiplication of sum or error signals of the monopulse receivers takes place in the video stages and accordingly, the multiplier 43 is of a suitable type for operation at video frequencies. For this purpose, preferably an electronic type of multiplier is employed which remains linear in its output over the requisite operating range, for example, as illustrated in FIG. 9, a push-pull type of circuit may be utilized employing a pair of dual control pentodes such as pentodes 141 and 142, supplied by a common power supply having a positive terminal 140 and a negative terminal 143 with a common cathode resistor 144 and a common load or anode resistor 145. The tubes 141 and 142 are preferably dual control pentode types having basically high suppressor-to-plate mutual conductance in which the suppressor-to-plate trans-conductance changes linearly with voltage applied to the first or the third grid over the operating range, for example, pentodes of the type sold under the manufacturers universal designations 6AS6 or 5784 may be employed.

As illustrated in FIG. 9, the tubes 141 and 142 have number 1 grids 146 and 147 connected through suitable means, which will be understood by those skilled in the art, to the output of the difference circuit 53 in the line 54 for applying voltages of opposite polarity to the grids 146 and 147.

The tubes 141 and 142 have suppressor grids or number 3 grids 148 and 149 which are likewise so connected through suitable means to the output of the video detector 33 so as to receive voltages of opposite polarity proportional to the signal output of the video detector 33, or the quantity $E_s$.

It will be understood that the output of the multiplier of FIG. 9 is taken from the anodes, for example, through a coupling condenser 150.

As will be explained in greater detail hereinafter, the indicator 42 may also be made responsive to inequality of two quantities, one being $RE_d$, the other $H_oE_s$. In this case a video-frequency multiplier of the type illustrated in FIG. 9 may be interposed in the output of the video phase detector 34 instead of the output of the video detector 33 and the multiplying function changed from $$\frac{H_o}{R}-N$$

to R in order to introduce into the difference circuit 45, a quantity representing the product of two variables R and $E_d$. In this case a fixed multiplier in the output of the video detector 33 is sufficient to represent the product $H_oE_s$, since $H_o$ is a constant.

Figure 1:
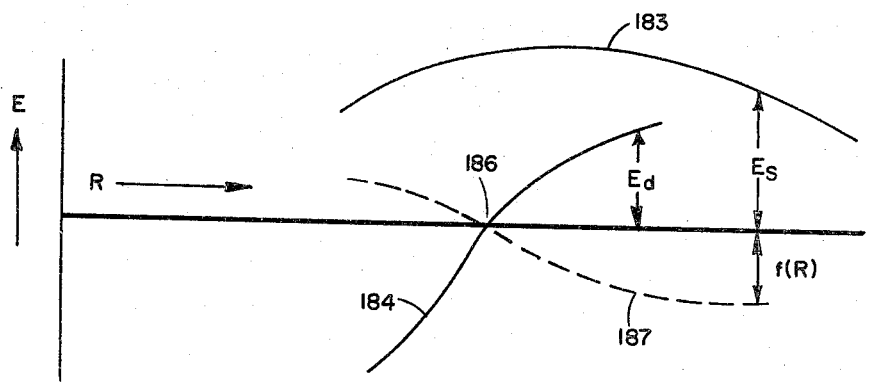

As illustrated in FIG. 1, the receiving path of a monopulse antenna is characterized by a maximum in the space pattern of so-called range or sum signals represented by curve 183 in coincidence with a zero or minimum in the space pattern of the error or difference signal represented by the curve 184. In curves 183 and 184, the points are plotted so that vertical distances represent relative intensity of the output signals of the sum video detector 33 and the error video phase detector 34 respectively, and horizontal distances represent time which is also proportional to slant range. The demodulated reflections of the transmitted pulses are measured by the video detectors 33 and 34. Since as already described, the aircraft 11 carries the monopulse receiving antenna 12 in level flight at a fixed depression angle, the geometry of the aircraft flight and receiving patterns of the monopulse antenna may be combined.

For a fixed altitude of the aircraft and a known depression angle of the antenna, a reference may be established for the aircraft flying over terrain by a comparison of the sum and difference signals from the antenna. Then, if an obstacle protrudes above the reference, the previously established reference level will be exceeded because of a change in the geometry due to the obstacle. The change in geometry causes a change in the sum and difference signals from the antenna. Use is then made of this change in the sum and difference signals to develop a warning voltage to apply to an indicator. From the geometry of the problem, it can be seen that the slant range to the point 186 on the ground at which the null in the elevation difference signal occurs is determined by the altitude of the aircraft and the angle of depression of the antenna under the assumption of flight over level ground.

In FIG. 2, the slant range to this point 186 is designated as $R_o$. For horizontal terrain assumed in FIG. 1, the elevation difference signal $E_d$ will undergo the change in polarity indicated by the curve 184 about the point 186. The sum $E_s$ will likewise undergo a variation with range with a maximum occurring at the same range at which $E_d$ becomes 0. In accordance with the invention, the sum signal $E_s$ is multiplied by a suitable function of the range, $f(R)$, in such a manner that the product $E_s.f(R)$ will be equal and opposite to $E_d$. By proper selection of $f(R)$ the sum is formed:

$$E_d + f(R).E_s = 0$$

If $f(R)$, indicated in FIG. 1 by the curve 187, is multiplied by $E_s$ and the sum added algebraically to $E_d$, the net result would be zero.

Figure 3:
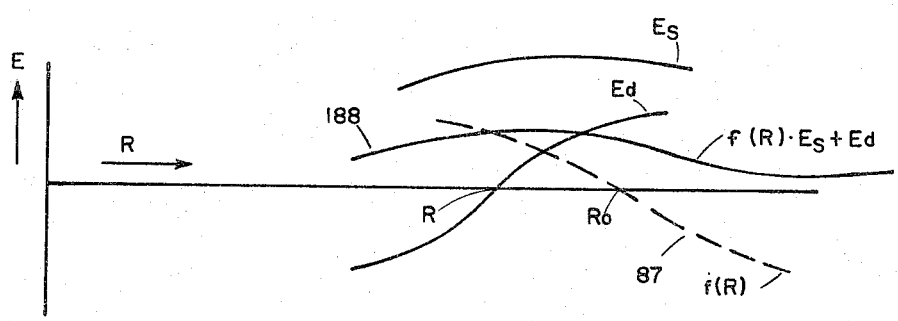
FIG. 3 is a graph corresponding to FIG. 1 for the ground profile of FIG. 2.

If the aircraft which is presumed to be in level flight at a fixed altitude $H_0$ approaches terrain as indicated in FIG. 2, the point at which the null in the difference voltage $E_d$ occurs will move closer to the aircraft in slant range R as will the maximum in the sum signal $E_s$. The results of this situation are illustrated by FIG. 3. With the situation as indicated in FIG. 2, the algebraic sum $f(R).E_s + E_d$ will no longer be everywhere zero and a warning signal may be developed from the amount that this expression differs from zero. The difference from zero is indicated by the heavy line 188 in FIG. 3.

As the study of FIG. 3 indicates, the function $f(R)$, which multiplies the sum signal, remains fixed in range and is completely determined by the clearance level which it is desired to maintain. Therefore, by selection of a suitable multiplying function $f(R)$ the system operates essentially on the distortion of the received signal level introduced by obstacles which protrude above the assumed ground level. It has been found that a relationship exists for a monopulse antenna which expresses the difference signal $E_d$ as a function of the sum signal $E_s$. Within the practical limits of the portions of the monopulse lobes 14 and 15 which are used, the antenna characteristics are expressed by the relation $$\frac{E_d}{E_s} = KB$$

where B is the angle of the reflected signal from the antenna axis 58 and K is a constant of proportionality. This ratio is linear to at least the maximum of the error patterns 14 and 15.

Figure 4:
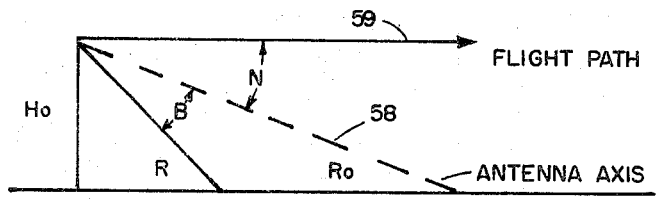
FIG. 4 is a diagram illustrating the geometric relationships involved.

From the geometry of the problem, an expression is readily obtainable for B as a function of range. Considering the aircraft to be on flight at a fixed altitude $H_o$ over level ground, carrying an antenna which is depressed an angle N from the flight path, the geometry is as illustrated in FIG. 4.

$$\sin(N+B) = \frac{H_o}{R}$$

$$B = \sin^{-1}\left(\frac{H_o}{R}\right) - N$$

Since $H_o$ is the desired clearance level, it will be in general very much smaller than R, the slant range to the ground, so that to a good approximation $$\sin^{-1}\frac{H_o}{R} = \frac{H_o}{R}$$

$$B = \frac{H_o}{R} - N$$

That $H_o/R$ is always small in any practical case can be established on the basis of the intended use of the equipment. Terrain clearance must take into account the "pullout" ability of both the aircraft and the pilot. Flying at low levels requires that $N+B$ be small in order to make R sufficiently large to permit proper "pull-out."

Accordingly, the indicator 42, responsive to occurrence of error signals $E_d$ exceeding the adjusted value of sum signals, viz.

$$E_s\left(\frac{H_o}{R} - N\right)$$

provides a warning of dangerous obstacles in low flight and warns the pilot to "pull out."

If desired, the antenna 12 may be mounted with a relatively small depression angle so that the factor N may be disregarded and the equations for warning voltage at the indicator 42 becomes $$E_w = E_d - E_s\frac{H_o}{R} = K\left(\frac{H}{R} - \frac{H_o}{R}\right)E_s = \frac{KE_s}{R}(H - H_o)$$

since $$E_d = KBE_s = \frac{KHE_s}{R}$$

where K is a constant, H is the actual clearance height of an aircraft, and B is the angle of reflected waves from the antenna boresight.

The warning signal may also be written $$E_w' = RE_d - H_oE_s$$

in which $E_w'$ is a warning voltage which contains essentially the same information as $E_w$. Accordingly, if desired, a mechanization may be employed in which production of an inverse range function is unnecessary and a multiplier of a variable quantity is introduced into the input to the indicator 42 from the error phase detector 34 instead of the sum video detector 33. Such multiplier need merely apply a factor to the output of the error video phase detector 34 since the factor $H_o$ is a fixed value for any desired factor of safety of operation of a specified aircraft.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A terrain clearance warning system comprising in combination with a monopulse radar system, having sum and error channels with intermediate frequency amplifiers in each and a directive antenna, the amplifiers having gain control terminals, a voltage responsive warning indicator for warning a pilot of inadequate terrain clearance, a difference circuit with first and second input connections each from one of said channels and an output connection to said indicator, a multiplier interposed in the second of said input connections and having a multiplying voltage input, a voltage generating source responsive to slant range, a voltage source for setting in a voltage corresponding to desired clearance, means energized by said voltage sources for supplying energy to said multiplying voltage input of said multiplier, a generator of voltage proportional inversely to the square of slant range and a connection from said inverse square generator to the gain control terminals of the intermediate frequency amplifiers.

2. A ground clearance warning system comprising in combination with a monopulse radar system, having sum and error channels with intermediate frequency amplifiers in each and a directive antenna with a beam center line; the intermediate frequency amplifiers having voltage responsive gain control terminals; a voltage responsive indicator for warning the pilot of inadequate terrain clearance; a difference circuit having input connections from said intermediate frequency channels and output connections to said indicator, a multiplier interposed in the connection to the difference circuit from the sum channel; means for maintaining the antenna in elevation with a predetermined depression angle of its beam center line; means for generating a voltage corresponding thereto; means for generating a voltage proportional to the ratio of desired terrain clearance to slant range from the antenna to ground; a difference circuit responsive to said ratio voltage and said depression angle voltage with an output connection to said multiplier; and means for adjusting the gain of said intermediate frequency amplifiers to prevent receiver saturation.

3. A system as in claim 2 in which a second multiplier is provided for producing the voltage proportional to the ratio of desired clearance altitude and slant range; said second multiplier having two input connections; means for setting in a voltage proportional to the desired clearance altitude applied to one of said multiplier connections and means for generating voltage inversely proportional to slant range applied to said other multiplier connection.

4. A ground clearance warning system comprising in combination, a radar system having a transmitter producing pulses of high-frequency electromagnetic energy in response to tripping voltages; means for periodically generating such tripping voltages; sum and error receiver channels with intermediate frequency amplifiers in each; a directive antenna for aircraft mounting coupled to said transmitter and to said receiver channels having a beam center line; means for maintaining the antenna in a position in elevation with a predetermined depression angle of the beam center line; a voltage responsive indicator for warning the pilot of inadequate terrain clearance; a difference circuit having first and second input connections from said receiver channels and an output connection to said indicator; a multiplier interposed in the second of said receiver channels having an output connection to the difference circuit; an input connection from the second of said channels and a second input connection; means for generating and applying to said second input connection a voltage proportional to the ratio of desired clearance altitude and slant range from the antenna to ground; said intermediate frequency amplifiers having gain control terminals; a square-wave generator having a tripping terminal coupled to said tripping voltage generator for initiating a square wave whenever the transmitter produces a pulse of electromagnetic energy; a plurality of resistance-capacity integrating circuit means responsive to said square-wave generator for producing exponential voltage curves; means for combining such exponential curves to form a curve simulating the reciprocal of the square of the slant range to ground from the antenna which is represented by the time delay from the initiation of the square wave; connections from said exponential voltage combining means to the gain control terminals of the amplifiers for simultaneously adjusting the gains of said intermediate frequency amplifiers to compensate for variations in slant range and maintain the signal strength independent thereof.

5. In combination, an aircraft, a monopulse antenna mounted thereon, having a beam center line depressed a fixed angle with respect to the line of flight of the aircraft; means for generating a voltage proportional to the depression angle of said center line; a tripping voltage generator for producing periodical tripping voltages; a transmitter responsive thereto for periodically transmitting pulses of electromagnetic energy from said antenna; sum and error monopulse receiver channels coupled to said antenna; a voltage-responsive indicator for warning a pilot of inadequate terrain clearance; a difference circuit having first and second input connections and an output connection to said indicator, the first input connection being coupled to one of said monopulse receiver channels, a multiplier having an output connection to the second input connection of said difference circuit, having a first input connection from the remaining monopulse receiver channel and having a second input connection; a second difference circuit having an output connection to the second multiplier input connection, having a first input connection from said depression angle voltage generator and having a second input connection; means for generating and supplying to said second input connection a voltage proportional to the ratio of desired clearance altitude and slant range to ground from the antenna; said monopulse receiver channels having means for preventing receiver saturation.

6. A warning device comprising in combination a monopulse receiver mounted upon an aircraft, having sum and error channels; an indicator for warning the pilot of inadequate terrain clearance responsive to the output of one of said channels, means for generating a signal indicative of the ratio of a preselected clearance altitude and slant range from the aircraft to ground, and means responsive to said generating means and the other of said channels for diminishing said output in accordance with said signal.

7. Apparatus, as in claim 6, wherein means are provided for maintaining dynamic range of the receiver channels, independent of variations in slant range.

8. A warning device, comprising in combination, an antenna having feed elements for producing a beam pattern having relatively small variations in radiation intensity and received signal for deviation from a selected center line and for producing a twin-lobe beam pattern having variations in received signal with deviation from the center line; receiver channels each responsive according to one of the two patterns; an indicator, means for modifying the signal in one of said channels in accordance with a predetermined function of slant range and desired clearance altitude, and means for providing to the indicator a signal according to the relationship between said modified signal and the signal in the other of said channels.

9. A terrain clearance warning system comprising in combination a monopulse receiver mounted upon an aircraft having sum and error channels with means for preventing saturation of either channel and maintaining the same gain in each channel so that the ratio between channel outputs is unaffected by variation in strength of received signals, a warning indicator having input connections from the channels applied differentially to the indicator, and means for varying the relationship between inputs to the indicator comprising signal-strength varying means responsive to slant range and to desired clearance altitude for varying the input signal strength to said indicator from one of said channels.

10. Apparatus for detecting clearance of an aircraft above ground obstructions which comprises monopulse means for transmitting energy toward the ground and monopulse means for obtaining sum and error signal reflections from ground with a boresight having a predetermined angle, means for determining the ratio of error signal reflections to sum signal reflections to determine the angle between such reflections and the boresight, means for multiplying the signal strength of sum channel reflections by the ratio of the desired clearance altitude to the slant range of the reflections, and means for comparing the product with the error channel reflections representing the angle between reflections to the boresight for determining departure from equality between the two quantities to ascertain inadequate clearance.

11. In a monopulse radar including an antenna having a twin lobe radiation pattern, first receiving means for providing a sum signal indicative of additively combined energy received from the lobes of said pattern, second receiving means for providing an error signal indicative of differentially combined energy received from said lobes, means for generating a clearance signal of selected fixed magnitude indicative of the distance from the radar to a selected clearance plane, means responsive to said generating means and said first receiving means for multiplying said sum signal in accordance with said clearance signal, and means for indicating the difference between said adjusted sum signal and said error signal.

12. A warning device comprising in combination a monopulse receiver adapted to be mounted upon a vehicle and having range and error channels each having an output, means for multiplying one of said channel outputs by a signal proportional to the clearance distance between said receiver and a preselected clearance plane and for multiplying one of said channel outputs by a signal proportional to a function of slant range, and means for comparing the channel outputs as so multiplied to provide an output representing presence of an obstacle with respect to which said receiver does not have said clearance distance.

13. A warning device comprising in combination a monopulse receiver adapted to be mounted upon a vehicle, and having sum and error channels each having an output, means for multiplying said sum channel output by a signal proportional to clearance distance between said vehicle and a selected clearance plane and for multiplying said sum channel output by a signal proportional to the reciprocal of slant range, and means for comparing said sum channel output as so multiplied with said error channel output to provide an output representing presence of an obstacle with respect to which said receiver does not have said clearance distance.

14. A ground viewing radar comprising in combination a monopulse receiver adapted to be mounted upon a vehicle, and having range and error channels each having an output, means for multiplying one of said channel outputs by a signal proportional to the height of said receiver with respect to a plane at a selected distance from the receiver and for multiplying one of said channel outputs by a signal proportional to a function of slant range, and means for comparing the channel outputs as so multiplied to provide an output representing presence of a target with respect to which said receiver does not have said height.

15. A system comprising a monopulse receiver having range and error channels each having an output, means for multiplying one of said channel outputs by a signal proportional to the height of said receiver with respect to a plane at a preselected distance from the receiver and for multiplying one of said channel outputs by a signal proportional to a function of slant range, means for comparing the channel outputs as so multiplied to provide an output representing height of a target with respect to said plane.

References Cited

UNITED STATES PATENTS

| | | | |
|---|---|---|---|
| 2,411,572 | 11/1946 | Hershberger | 343—5 |
| 2,574,853 | 11/1951 | Ward | 343—7.4 |
| 2,624,871 | 1/1953 | Meagher | 343—5.1 |
| 2,784,400 | 3/1957 | Ehrenfried | 343—16.1 |
| 2,831,969 | 4/1958 | Jankowski | 343—16.1 |
| 2,948,892 | 8/1960 | White | 343—16.1 |

FOREIGN PATENTS

| | | |
|---|---|---|
| 538,782 | 3/1957 | Canada. |
| 771,246 | 3/1957 | Great Britain. |

OTHER REFERENCES

Schlieben: "Radomes and Aircraft Design," vol. 11, No. 5, May 1952, Aeronautical Engineering Review, pp. 69–81.

CHESTER L. JUSTUS, *Primary Examiner.*

NORMAN H. EVANS, FREDERICK M. STRADER, *Examiners.*

J. W. DESIMONE, G. J. MOSSINGHOFF, L. MEYERS, J. P. MORRIS, *Assistant Examiners.*